(No Model.)
J. W. CALEF.
HOE.
No. 362,876. Patented May 10, 1887.
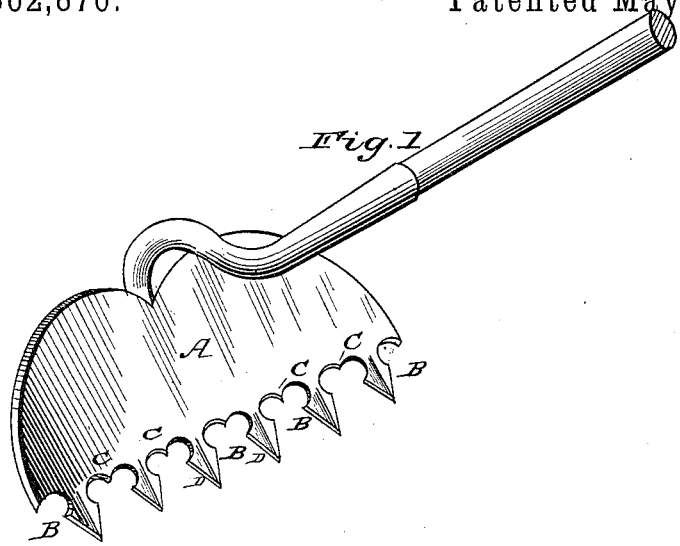
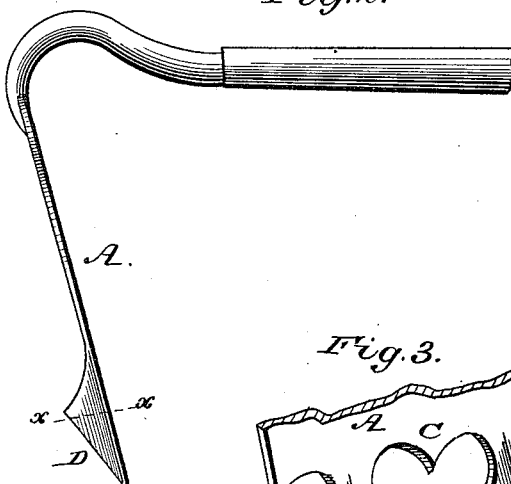
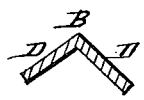
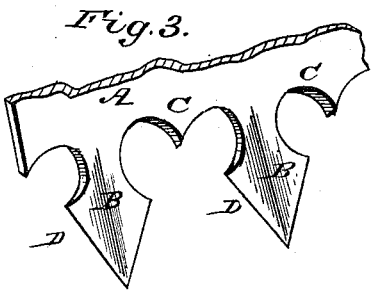
WITNESSES:
Fred G. Dieterich
[signature]
INVENTOR.
Joseph W. Calef
by Louis Bagger & Co.
ATTORNEYS.
N. PETERS. Photo-Lithographer, Washington, D. C.

UNITED STATES PATENT OFFICE.

JOSEPH WARREN CALEF, OF NORTH EASTON, MASSACHUSETTS, ASSIGNOR TO GEORGE W. KENNEDY, OF SAME PLACE.

HOE.

SPECIFICATION forming part of Letters Patent No. 362,876, dated May 10, 1887.

Application filed June 11, 1884. Renewed July 2, 1885. Again renewed April 5, 1887. Serial No. 233,746. (No model.)

*To all whom it may concern:*

Be it known that I, JOSEPH WARREN CALEF, a citizen of the United States, and a resident of North Easton, in the county of Bristol and State of Massachusetts, have invented certain new and useful Improvements in Hoes; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view of my improved hoe. Fig. 2 is an edge view of the same. Fig. 3 is a detail view of two of the teeth in the edge of the hoe on an enlarged scale; and Fig. 4 is a cross-sectional detail view on line *x x*, Fig. 3.

Similar letters of reference indicate corresponding parts in all the figures.

My invention has relation to hoes; and it consists in the improved construction of parts of the same, as hereinafter more fully described and claimed.

In the accompanying drawings, the letter A indicates the blade, which may be of any desired shape, and which is secured to the handle in any desired manner, and the edge of the blade is cut out to form a series of larger arrow-head-shaped teeth, B, alternating with a number of small points, C. The teeth are bent along their middle, forming rearwardly-inclined sides D, making the teeth of a shape similar to the cultivator-teeth commonly used, and it will be seen that the teeth will cause the blade to enter the ground more readily, and that the hoe may be dragged over the ground, performing the duty of a rake or small cultivator, the larger teeth breaking up the ground and crushing the larger clods, while the smaller points pulverize the ground broken up by the larger teeth.

The inclined sides of the teeth will enable them to pass more readily through the ground, and will prevent rubbish from gathering between the teeth, the rubbish slipping off on the inclined sides.

I am aware that it is not broadly new to have hand-cultivators provided with a number of curved shovel-blades alternating with rake-teeth, and I do not wish to claim such construction, broadly; but I am not aware that the blade of a hoe has been made with the edge cut out to form alternating larger bent and arrow-head-shaped teeth and alternating smaller teeth or points; and I therefore claim—

A hoe having a number of arrow-head-shaped teeth upon its edge having their sides bent or inclined rearward along the middles of the teeth, alternating with a number of smaller points projecting between the reduced bases of the teeth, as an improved article of manufacture.

In testimony that I claim the foregoing as my own I have hereunto affixed my signature in presence of two witnesses.

JOSEPH WARREN CALEF.

Witnesses:
    GEO. B. IVES,
    BENJAMIN N. JOHNSON.